US012764293B2

(12) United States Patent
De Lagrange et al.

(10) Patent No.: US 12,764,293 B2
(45) Date of Patent: Oct. 13, 2026

(54) SINGLE-INDEX QUANTIZATION MATRIX DESIGN FOR VIDEO ENCODING AND DECODING

(71) Applicant: InterDigital CE Patent Holdings, SAS, Paris (FR)

(72) Inventors: Philippe De Lagrange, Cesson-Sevigne (FR); Fabrice Leleannec, Cesson-Sevigne (FR); Karam Naser, Cesson-Sevigne (FR); Edouard Francois, Cesson-Sevigne (FR); Pierre Andrivon, Liffre (FR); Ya Chen, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/937,520

(22) Filed: Nov. 5, 2024

(65) Prior Publication Data

US 2025/0071280 A1 Feb. 27, 2025

Related U.S. Application Data

(63) Continuation of application No. 17/603,168, filed as application No. PCT/EP2020/066614 on Jun. 16, 2020, now Pat. No. 12,170,771.

(30) Foreign Application Priority Data

Jun. 21, 2019 (EP) .................................... 19305802
Jun. 24, 2019 (EP) .................................... 19305826

(51) Int. Cl.
*H04N 19/126* (2014.01)
*H04N 19/70* (2014.01)

(52) U.S. Cl.
CPC ........... *H04N 19/126* (2014.11); *H04N 19/70* (2014.11)

(58) Field of Classification Search
CPC .... H04N 19/126; H04N 19/70; H04N 19/119; H04N 19/124; H04N 19/14;
(Continued)

(56) References Cited

U.S. PATENT DOCUMENTS

2006/0177143 A1 8/2006 Winger
2012/0251015 A1 10/2012 Lim et al.
(Continued)

FOREIGN PATENT DOCUMENTS

EP 2806640 A1 11/2014
EP 3917142 A1 12/2021
(Continued)

OTHER PUBLICATIONS

Chubach et al., "CE7-related: Support of signalling default and user-defined scaling matrices", Document: JVET-N0090-v2, Joint Video Experts Team (JVET) of ITU-T SG 16 WP 3 and ISO/IEC JTC 1/SC 29/WG 11, 14th Meeting: Geneva, CH, 19-17, pp. 1-5, Mar. 2019.
(Continued)

*Primary Examiner* — Maria E Vazquez Colon
(74) *Attorney, Agent, or Firm* — Xiaoan Lu

(57) ABSTRACT

Different quantization matrices may be transmitted corresponding to different block sizes, color components and prediction modes. To more efficiently signal the coefficients of the quantization matrices, in one implementation, a unified matrix identifier matrixId is used, based on a size identifier (sizeId) that relates to CU size with larger sizes listed first, and a matrix type (matrixTypeId) with luma QMs listed first. For example, the unified identifier is derived as: matrixId=N*sizeId+matrixTypeId, where N is the number of
(Continued)

possible type identifiers, e.g., N=6. This single identifier allows referring to any previously transmitted matrix when using prediction (copy), and transmitting larger matrices first avoids interpolation in the prediction process. When a block uses the Intra Block Copy prediction mode, QM identifier may be derived as if the block uses the INTER prediction mode.

16 Claims, 9 Drawing Sheets

(58) Field of Classification Search
CPC .. H04N 19/159; H04N 19/176; H04N 19/186; H04N 19/463
See application file for complete search history.

(56) References Cited

U.S. PATENT DOCUMENTS

| | | | | |
|---|---|---|---|---|
| 2015/0078442 | A1 | 3/2015 | Lim et al. | |
| 2015/0085924 | A1 | 3/2015 | Gamei et al. | |
| 2015/0334396 | A1 * | 11/2015 | Lim | H04N 19/126 375/240.03 |
| 2019/0082180 | A1 | 3/2019 | Wang et al. | |
| 2019/0082184 | A1 | 3/2019 | Hannuksela | |
| 2022/0086443 | A1 * | 3/2022 | Lim | H04N 19/124 |
| 2022/0345708 | A1 | 10/2022 | Tsukuba | |

FOREIGN PATENT DOCUMENTS

| | | | | |
|---|---|---|---|---|
| JP | 2014011482 | A | 1/2014 | |
| JP | 2015504289 | A | 2/2015 | |
| KR | 20130058524 | A * | 6/2013 | H04N 19/172 |
| TW | 202044842 | A | 12/2020 | |
| WO | WO2011052215 | A1 | 5/2011 | |
| WO | WO2012108237 | A1 | 8/2012 | |

OTHER PUBLICATIONS

Silcock "Extension of HM7 to Support Additional Chroma Formats", Document: JCTVC-J0191 version 3, Joint Collaborative Team on Video Coding (JCT-VC) of ITU-SG 16 WP 3 and ISO/IEC JTC 1/SC 29/WG 11, 10th Meeting: Stockholm, SE, pp. 1-16, Jul. 11-20, 2012.

Tanaka et al., "Quantization Matrix for HEVC", Document: JCTVC-E073, Joint Collaborative Team on Video Coding (JCT-VC) of ITU-T SG16 WP3 and ISO/ IEC JTC1/SC29/WG11, 5th Meeting: Geneva, CH, Mar. 16-23, 2011, 24 pages.

Silcock et al., "AHG12: Extension of HM7 to Support Additional Chroma Formats", Document: JCTVC-J0191, version 4, Joint Collaborative Team on Video Coding (JCT-VC) of ITU-T SG 16 WP 3 and ISO/IEC JTC 1/SC 29/WG 11, 10th Meeting: Stockholm, SE, pp. 1-16, Jul. 11-20, 2012.

Chubach et al., "CE7-related: Support of quantization matrices for VVC", Joint Video Experts Team (JVET) of ITU-T SG 16 WP 3 and ISO/IEC JTC 1/SC 29/WG 11, Document: JVET-N0847-v1, 14th Meeting: Geneva, Switzerland, Mar. 19, 2019, 4 pages.

De Lagrange et al., "Non-CE7: Quantization matrices with single identifier and prediction from larger ones", Joint Video Experts Team (JVET) of ITU-T SG 16 WP 3 and ISO/IEC JTC 1/SC 29/WG 11, Document: JVET-O0223, 15th Meeting: Gothenburg, Sweden, Jul. 3, 2019, 14 pages.

* cited by examiner

SINGLE-INDEX QUANTIZATION MATRIX DESIGN FOR VIDEO ENCODING AND DECODING

CROSS-REFERENCE TO RELATED APPLICATIONS

This application is a Continuation of U.S. application Ser. No. 17/603,168, filed Oct. 12, 2021, which is a National Phase entry under 35 U.S.C. § 371 of International Application No. PCT/EP2020/066614, filed Jun. 16, 2020, which claims the benefit of European Patent Application No. 19305826.0, filed Jun. 24, 2019, and European Patent Application No. 19305802.1 filed Jun. 21, 2019, the entirety of which is incorporated by reference herein.

TECHNICAL FIELD

The present embodiments generally relate to a method and an apparatus for quantization matrix design in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video decoding is provided, comprising: obtaining a single identifier for a quantization matrix, based on a block size, color component, and prediction mode of a block to be decoded in a picture; decoding a syntax element indicating a reference quantization matrix, wherein said syntax element specifies a difference between an identifier of said reference quantization matrix and said obtained identifier for said quantization matrix; obtaining said quantization matrix based on said reference quantization matrix; de-quantizing transform coefficients for said block responsive to said quantization matrix; and decoding said block responsive to said de-quantized transform coefficients.

According to another embodiment, a method for video encoding is provided, comprising: accessing a block to be encoded in a picture; accessing a quantization matrix for said block; obtaining a single identifier for said quantization matrix, based on a block size, color component, and prediction mode of said block; encoding a syntax element indicating a reference quantization matrix, wherein said syntax element specifies a difference between an identifier of said reference quantization matrix and said obtained identifier for said quantization matrix; quantizing transform coefficients for said block responsive to said quantization matrix; and entropy encoding said quantized transform coefficients.

According to another embodiment, an apparatus for video decoding is provided, comprising one or more processors, wherein said one or more processors are configured to:

obtain a single identifier for a quantization matrix, based on a block size, color component, and prediction mode of a block to be decoded in a picture; decode a syntax element indicating a reference quantization matrix, wherein said syntax element specifies a difference between an identifier of said reference quantization matrix and said obtained identifier for said quantization matrix; obtain said quantization matrix based on said reference quantization matrix; de-quantize transform coefficients for said block responsive to said quantization matrix; and decode said block responsive to said de-quantized transform coefficients.

According to another embodiment, an apparatus for video encoding is provided, comprising one or more processors, wherein said one or more processors are configured to: access a block to be encoded in a picture; access a quantization matrix for said block; obtain a single identifier for said quantization matrix, based on a block size, color component, and prediction mode of said block; encode a syntax element indicating a reference quantization matrix, wherein said syntax element specifies a difference between an identifier of said reference quantization matrix and said obtained identifier for said quantization matrix; quantize transform coefficients for said block responsive to said quantization matrix; and entropy encode said quantized transform coefficients.

According to another embodiment, an apparatus of video decoding is provided, comprising: means for obtaining a single identifier for a quantization matrix, based on a block size, color component, and prediction mode of a block to be decoded in a picture; means for decoding a syntax element indicating a reference quantization matrix, wherein said syntax element specifies a difference between an identifier of said reference quantization matrix and said obtained identifier for said quantization matrix; means for obtaining said quantization matrix based on said reference quantization matrix; means for de-quantizing transform coefficients for said block responsive to said quantization matrix; and means for decoding said block responsive to said de-quantized transform coefficients.

According to another embodiment, an apparatus of video encoding is provided, comprising: means for accessing a block to be encoded in a picture; means for accessing a quantization matrix for said block; means for obtaining a single identifier for said quantization matrix, based on a block size, color component, and prediction mode of said block; means for encoding a syntax element indicating a reference quantization matrix, wherein said syntax element specifies a difference between an identifier of said reference quantization matrix and said obtained identifier for said quantization matrix; means for quantizing transform coefficients for said block responsive to said quantization matrix; and means for entropy encoding said quantized transform coefficients.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
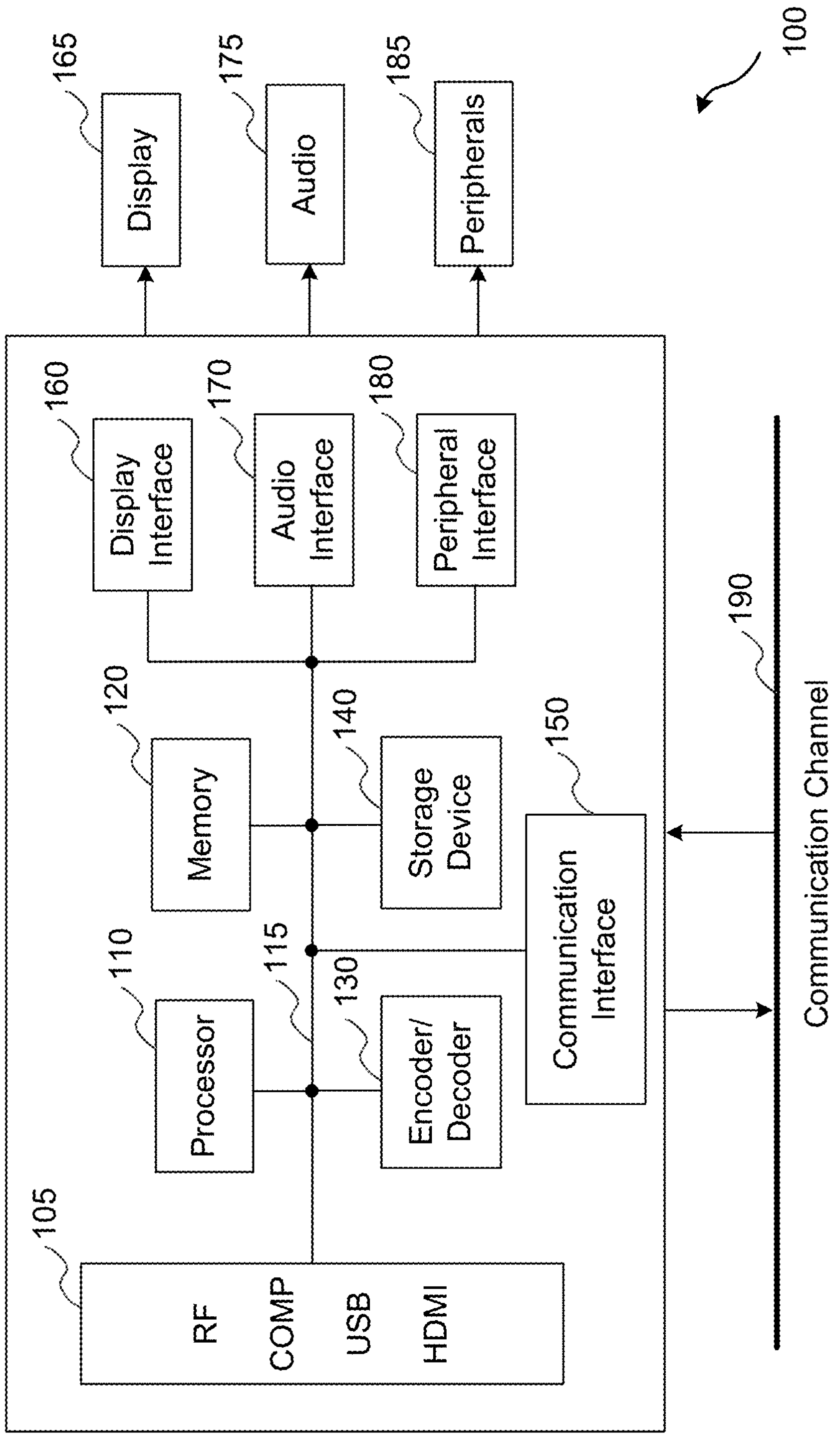
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
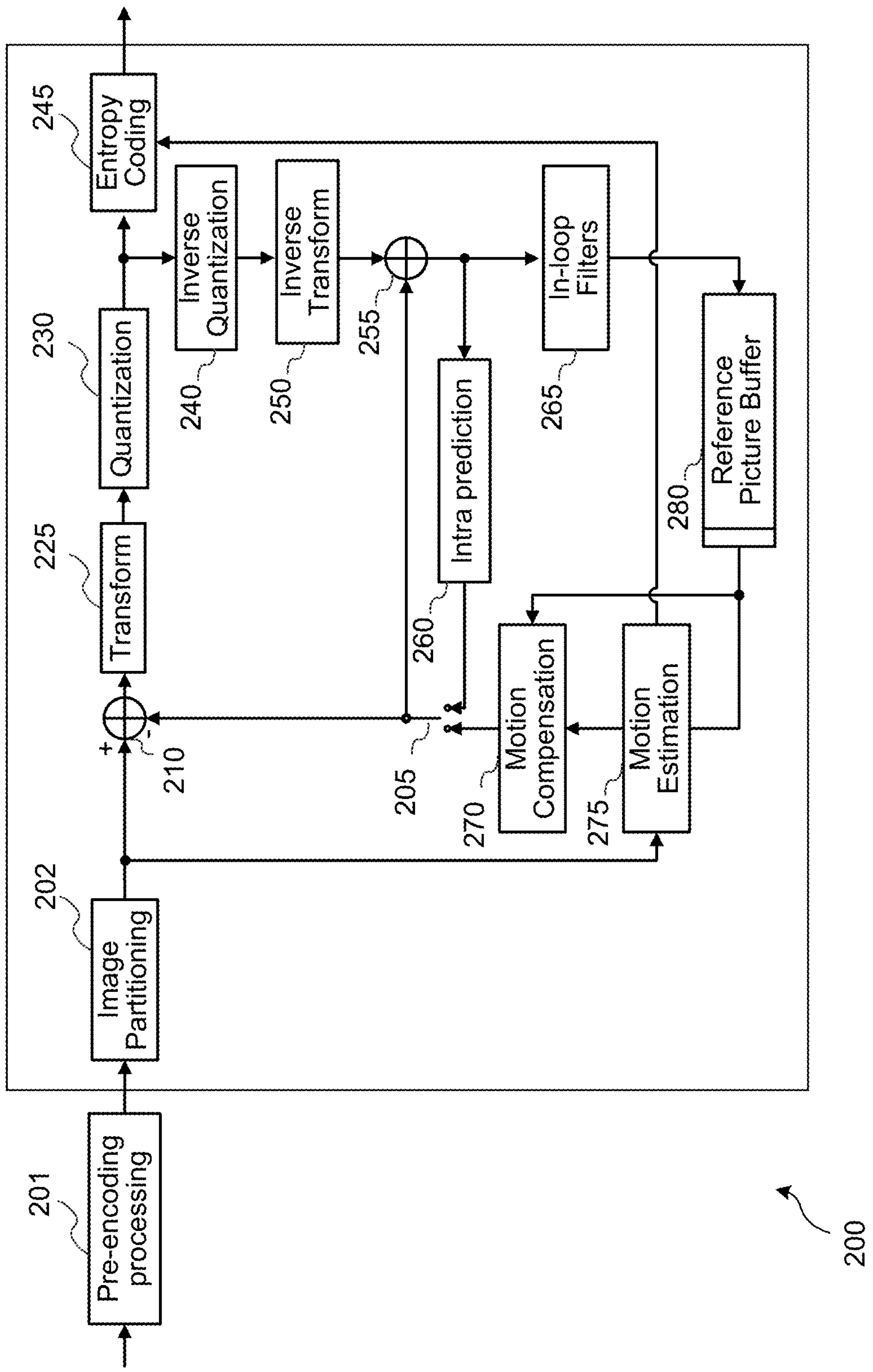
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
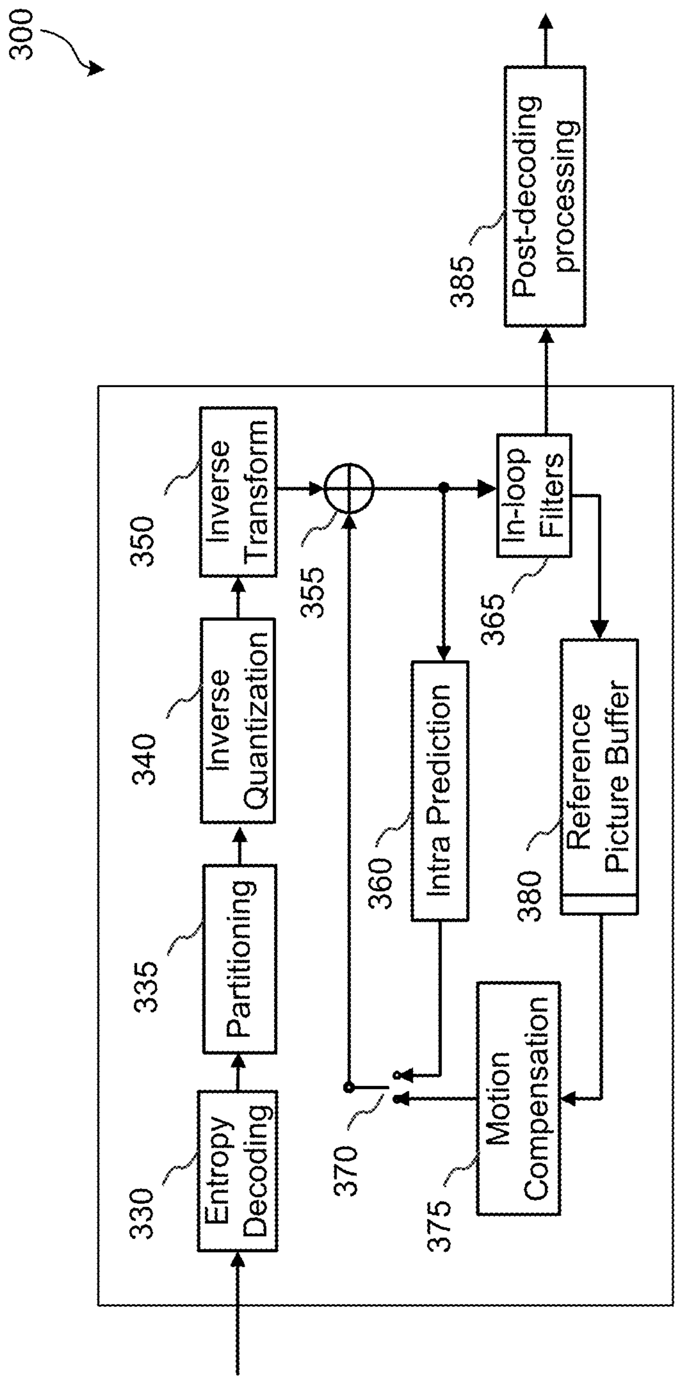
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

The HEVC specification allows the use of quantization matrices in the dequantization process, where transformed coefficients are scaled by the current quantization step and further scaled by a quantization matrix (QM) as follows:

$$d[x][y] = \text{Clip3}(\text{coeffMin}, \text{coeffMax}, ((\text{TransCoeffLevel}[xTbY][yTBY][cIdx][x][y] * m[x][y] * \text{levelScale}[qP\%6] << (qP/6)) + (1 << (\text{bdShift}-1))) >> \text{bdShift})$$

where:

TransCoeffLevel[ . . . ] are the transformed coefficients absolute values for the current block identified by its spatial coordinates xTbY, yTbY and its component index cIdx.

x and y are the horizontal/vertical frequency indices.

qP is the current quantization parameter.

the multiplication by levelScale [qP % 6] and left shift by (qP/6) is the equivalent of the multiplication by quantization step qStep=(levelScale[qP % 6]<<(qP/6)).

m[ . . . ][ . . . ] is the two-dimensional quantization matrix. Here, because the quantization matrix is used for scaling, it may also be referred to as a scaling matrix.

bdShift is an additional scaling factor to account for image sample bit depth. The term (1<<(bdShift−1)) serves the purpose of rounding to the nearest integer.

d[ . . . ] are the resulting dequantized transformed coefficients absolute values.

The syntax used by HEVC to transmit quantization matrices is described in the following:

| | Descriptor |
|---|---|
| scaling_list_data( ) { | |
| for( sizeId = 0; sizeId < 4; sizeId++ ) | |
| for( matrixId = 0; matrixId < 6; matrixId += ( sizeId = = 3 ) ? 3 : 1 ) { | |
| scaling_list_pred_mode_flag[ sizeId ][ matrixId ] | u(1) |
| if( !scaling_list_pred_mode_flag[ sizeId ][ matrixId ] ) | |
| scaling_list_pred_matrix_id_delta[ sizeId ][ matrixId ] | ue(v) |
| else { | |
| nextCoef = 8 | |
| coefNum = Min( 64, ( 1 << ( 4 + ( sizeId << 1 ) ) ) ) | |
| if( sizeId > 1 ) { | |
| scaling_list_dc_coef_minus8[ sizeId − 2 ][ matrixId ] | se(v) |
| nextCoef = scaling_list_dc_coef_minus8[ sizeId − 2 ][ matrixId ] + 8 | |
| } | |
| for( i = 0; i < coefNum; i++) { | |
| scaling_list_delta_coef | se(v) |
| nextCoef = ( nextCoef + scaling_list_delta_coef + 256 ) % 256 | |
| ScalingList[ sizeId ][ matrixId ][ i ] = nextCoef | |
| } | |
| } | |
| } | |
| } | |

It can be noted that

A different matrix is specified for each transform size (sizeId). In the scaling list data syntax structure, a scaling matrix is scanned into a 1-D scaling list (e.g., ScalingList).

For a given transform size, six matrices are specified, for intra/inter coding and Y/Cb/Cr components.

A matrix can be either

Copied from a previously transmitted matrix of the same size, if scaling_list_pred_mode_flag is zero (the reference matrixId is obtained as matrixId−scaling_list_pred_matrix_id_delta)

Copied default values specified in the standard (if both scaling_list_pred_mode_flag and scaling_list_pred_matrix_id_delta are zero)

Fully specified in DPCM coding mode, using exp-Golomb entropy coding, in up-right diagonal scanning order.

For block sizes greater than 8×8, only 8×8 coefficients are transmitted for signaling the quantization matrix in order to save coded bits. Coefficients are then interpolated using zero-hold (i.e., repetition), except for DC coefficient which is transmitted explicitly.

The use of quantization matrices similar to HEVC has been adopted in VVC draft 5 based on contribution JVET-N0847 (see O. Chubach, et al., “CE7-related: Support of quantization matrices for VVC,” JVET-N0847, Geneva, CH, March 2019). The scaling_list_data syntax has been adapted to the VVC codec as shown below.

TABLE 2

| QM type identifier (JVET-N0847) | | |
|---|---|---|
| CuPredMode | cIdx (Colour component) | matrixId |
| MODE_INTRA | 0 (Y) | 0 |
| MODE_INTRA | 1 (Cb) | 1 |
| MODE_INTRA | 2 (Cr) | 2 |
| MODE_INTER | 0 (Y) | 3 |
| MODE_INTER | 1 (Cb) | 4 |
| MODE_INTER | 2 (Cr) | 5 |

NOTE:
MODE_INTRA QMs are also used for MODE_IBC (Intra Block Copy).

The combination of both identifiers is shown in the following table:

```
                                                                                  Descriptor
scaling_list_data( ) {
  for( sizeId = 1; sizeId < 7; sizeId++ )
    for( matrixId = 0; matrixId < 6; matrixId ++ ) {
      if( ! ( (( sizeId == 1 ) && ( matrixId % 3 == 0 ) ) || (( sizeId == 6 ) && ( matrixId % 3 !=
0 ) )) ) {
        scaling_list_pred_mode_flag[ sizeId ][ matrixId ]                         u(1)
        if( !scaling_list_pred_mode_flag[ sizeId ][ matrixId ] )
          scaling_list_pred_matrix_id_delta[ sizeId ][ matrixId ]                 ue(v)
        else {
          nextCoef = 8
          coefNum = Min( 64, ( 1 << ( sizeId << 1 ) ) )
          if( sizeId > 3 ) {
            scaling_list_dc_coef_minus8[ sizeId − 4 ][ matrixId ]                 se(v)
            nextCoef = scaling_list_dc_coef_minus8[ sizeId − 4 ][ matrixId ] + 8
          }
          for( i = 0; i < coefNum; i++ ) {
            x = DiagScanOrder[ 3 ][ 3 ][ i ][ 0 ]
            y = DiagScanOrder[ 3 ][ 3 ][ i ][ 1 ]
            if ( !(sizeId==6 && x>=4 && y>=4) ) {
              scaling_list_delta_coef                                             se(v)
              nextCoef = ( nextCoef + scaling_list_delta_coef + 256 ) % 256
              ScalingList[ sizeId ][ matrixId ][ i ] = nextCoef
            }
          }
        }
      }
    }
}
```

In the design of VVC draft 5 with JVET-N0847 adoption, as in HEVC, a QM is identified by two parameters, matrixId and sizeId. This is illustrated in the following two tables.

TABLE 1

| Block size identifier (JVET-N0847) | | |
|---|---|---|
| Luma | Chroma | sizeId |
| — | — | 0 |
| — | 2 × 2 | 1 |
| 4 × 4 | 4 × 4 | 2 |
| 8 × 8 | 8 × 8 | 3 |
| 16 × 16 | 16 × 16 | 4 |
| 32 × 32 | 32 × 32 | 5 |
| 64 × 64 | — | 6 |

TABLE 3

| (matrixId, sizeId) combinations (JVET-N0847) | | | | | | | |
|---|---|---|---|---|---|---|---|
| INTRA | Y | | 0, 2 | 0, 3 | 0, 4 | 0, 5 | 0, 6 |
| | Cb | 1, 1 | 1, 2 | 1, 3 | 1, 4 | 1, 5 | |
| | Cr | 2, 1 | 2, 2 | 2, 3 | 2, 4 | 2, 5 | |
| INTER | Y | | 3, 2 | 3, 3 | 3, 4 | 3, 5 | 3, 6 |
| | Cb | 4, 1 | 4, 2 | 4, 3 | 4, 4 | 4, 5 | |
| | Cr | 5, 1 | 5, 2 | 5, 3 | 5, 4 | 5, 5 | |
| Block size: max(width, height) | | 2 | 4 | 8 | 16 | 32 | 64 |
| Signaled QM coefficients | | 2 × 2 | 4 × 4 | 8 × 8 | 8 × 8 + DC | | |

As in HEVC, for block sizes greater than 8×8, only 8×8 coefficients and DC coefficient are transmitted. QM of the correct size is reconstructed using zero-hold interpolation. For example, for a 16×16 block, every coefficient is repeated twice in both directions, then the DC coefficient is replaced by the transmitted one.

For rectangular blocks, the size retained for QM selection (sizeId) is the larger dimension, i.e., maximum of width and height. For example, for a 4×16 block, a QM for 16×16 block size is selected. Then, the reconstructed 16×16 matrix is decimated vertically by a factor 4 to obtain the final 4×16 quantization matrix (i.e., 3 lines out of 4 are skipped).

For the following, we refer to QMs for a given family of block sizes (square or rectangular) as size-N, in relation to sizeId and the square block size it is used for. For example, for block sizes 16×16 or 16×4, the QMs are identified as size-16 (sizeId 4 in VVC draft 5). The size-N notation is used to differentiate from exact block shape, and from the number of signaled QM coefficients (limited to 8×8, as shown in table 3).

Figure 4:
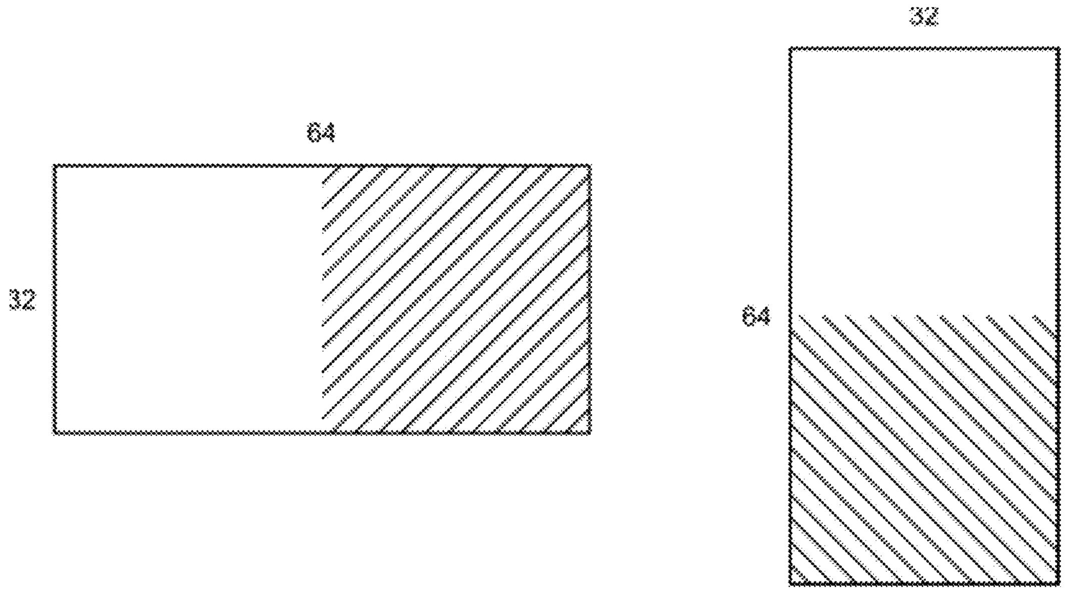
FIG. 4 illustrates that transform coefficients are inferred to zero for block sizes larger than 32 in VVC draft 5.

Furthermore, in VVC draft 5, for size-64, QM coefficients for the bottom-right quadrant are not transmitted (they are inferred to 0, which is called "zero-out" in the following). This is implemented by the "x>=4 && y>=4" condition in the scaling_list_data syntax. This avoid transmitting QM coefficients that are never used by the transformation/quantization process. Indeed, in VVC, for transform block sizes larger than 32 in any dimension (64×N, N×64, with N<=64), any transformed coefficient with x/y frequency coordinate larger or equal to 32 is not transmitted and inferred to zero, consequently, no quantization matrix coefficient is needed to quantize it. This is illustrated in FIG. 4, where the hatched area corresponds to transform coefficients inferred to zero.

Compared to HEVC, VVC needs more quantization matrices due to a higher number of block sizes. However, in VVC draft 5, QM prediction is still limited to copy of same block-size matrices, which can result in wasted bits. Moreover, syntax related to QMs is more complex because of the usage in VVC of block size 2×2 for chroma only, and of block size 64×64 for luma only. Also, JVET-N0847, as in HEVC, describes a specific matrix derivation process for each block size.

Some QM prediction techniques have been explored during HEVC standardization, for example, in JCTVC-E073 (sec J. Tanaka, et al., "Quantization Matrix for HEVC," JCTVC-E073, Geneva, CH, March 2011) and JCTVC-H0314 (see Y. Wang, et al., "Layered quantization matrices representation and compression," JCTVC-H0314, San José, CA, USA, February 2012).

JCTVC-E073: QMs are transmitted in specific parameter set (QMPS). Within a QMPS, QMs are transmitted in increasing size order (sizeId/matrixId similar to HEVC). Prediction (=copy) from any previously coded QM coefficients is proposed, including previous QMPS. Up-conversion with linear interpolation is used to adapt from a smaller reference QM, while simple down-sampling is used to adapt from a larger reference QM. This was finally rejected during HEVC standardization.

Figure 5:
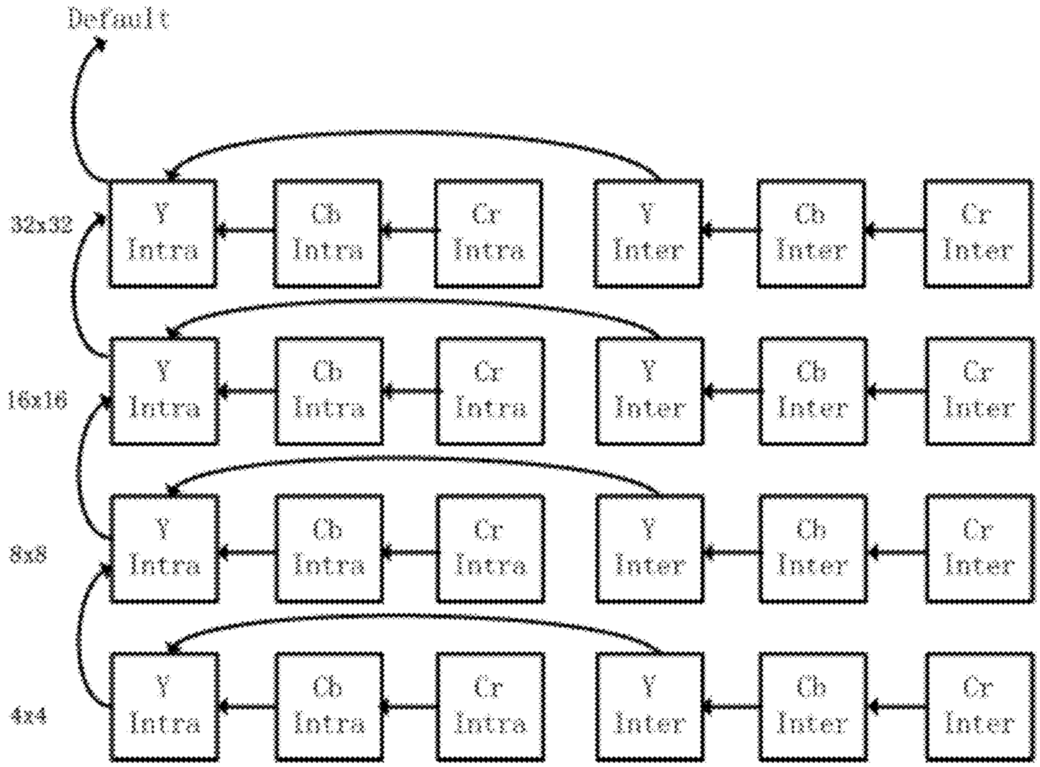
FIG. 5 illustrates fixed prediction tree as described in JCTVC-H0314.

JCTVC-H0314: QMs are transmitted in larger to smaller order. It is possible to copy a previously transmitted QM instead of transmitting a new one, using a fixed prediction tree (no explicit reference indexing) as shown in FIG. 5. Simple down-sampling is used if the reference QM is larger. This was finally rejected during HEVC standardization.

These two proposals are related to HEVC, and do not cope with the complications introduced by VVC.

The present application proposes to simplify the quantization matrix signaling and prediction process of VVC draft 5 (after adoption of JVET-N0847), while enhancing them so that any QM can be predicted from any previously signaled one, by incorporating one or more of the following:

- Unifying the QM index to encompass both size and type, so that a reference index difference can address any previously transmitted one;
- Transmitting quantization matrices in decreasing block size order;
- Specifying the prediction process as either a copy or decimation process, as needed;
- Transmitting all QM coefficients for size-64, so that size-64 QMs can be used as predictors.

Besides, a QM derivation process encompassing up-sampling for blocks larger that 8×8, and down-sampling for rectangular blocks is described to select the QM index depending on block parameters and adapt the QM signaled size to the actual block size.

For ease of notation, we consider the process of predicting a quantization matrix from default values or from a previously transmitted one as the QM prediction process, and the process of adapting the transmitted or predicted QM to the size and chroma format of the transform block as the QM derivation process. The QM prediction process can be part of the process of parsing the scaling list data, for example, at a picture level. The derivation process is usually at a lower level, for example, at the transform block level. Various aspects are presented in further detail below, followed by draft text example, and performance results.

- The derivation and usage of a single matrix index for identifying a QM. A single identifier allows referring to any previously transmitted matrix when using prediction (copy), and transmitting larger matrices first avoids interpolation in the prediction process.
- The QM prediction process, which consists in copying or decimating a previously signaled QM (the reference QM), be the reference QM transmitted, predicted, or default.
- The QM derivation process, which for a given transform block consists in selecting the QM index based on the block size, color component, and prediction mode, then to adapt the size of the selected QM to the size of the block. The resize process is based on bit-shifts of x and y coordinates within the transform block to index the coefficients of the selected QM.
- Transmission of all coefficients for size-64 QMs Compared to VVC draft 5, these aspects simplify specification (cuts text changes by half compared to JVET-N0847) and bring significant bit savings (bit cost of scaling_list_data can be cut by half).

Unified QM Index

The QM used for quantization/dequantization of a transform block is identified by one single parameter matrixId. In one embodiment, the unified matrixId (QM index) is a compound of:

- a size identifier which relates to the CU size (i.e., CU enclosing square shape, because only square-size matrices are transmitted) rather than block size. Note here for either luma or chroma, the size identifier is controlled by the luma block size, e.g., max (luma block width, luma block height). When luma and chroma tree are separated, for chroma, "CU size" would refer to the size of the block projected on the luma plane.
- a matrix type which first lists luma QMs, because they can be larger than chroma (e.g., in case of 4:2:0 chroma format)

According to this embodiment, the QM index derivation is illustrated in tables 4 and 5 and equation (1).

TABLE 4

| Size identifier (proposed) | | |
|---|---|---|
| Luma | Chroma | sizeId |
| 64 × 64 | 32 × 32 | 0 |
| 32 × 32 | 16 × 16 | 1 |

TABLE 4-continued

| Size identifier (proposed) | | |
|---|---|---|
| Luma | Chroma | sizeId |
| 16 × 16 | 8 × 8 | 2 |
| 8 × 8 | 4 × 4 | 3 |
| 4 × 4 | 2 × 2 | 4 |

TABLE 5

| Matrix type identifier (proposed) | | |
|---|---|---|
| CuPredMode | cIdx (Colour component) | matrixTypeId |
| MODE_INTRA | 0 (Y) | 0 |
| MODE_INTER | 0 (Y) | 1 |
| MODE_INTRA | 1 (Cb) | 2 |
| MODE_INTER | 1 (Cb) | 3 |
| MODE_INTRA | 2 (Cr) | 4 |
| MODE_INTER | 2 (Cr) | 5 |

The unified matrixId is derived as follows:

$$\text{matrixId} = N * \text{sizeId} + \text{matrixTypeId} \tag{1}$$

where N is the number of possible type identifiers, e.g., N=6.

In another embodiment, if more than six QM types are defined, sized should be multiplied by the correct number, which is the number of quantization matrix types. In other embodiments, other parameters can also be different, for example, specific block sizes, signaled matrix sizes (limited to 8×8 here), or the presence of a DC coefficient. It is noted here that QMs are listed by decreasing block size, and identified by a single index, as illustrated in table 6.

TABLE 6

| unified matrixId (proposed) | | | | | | | |
|---|---|---|---|---|---|---|---|
| Y | INTRA | 0 | 6 | 12 | 18 | 24 | |
| | INTER | 1 | 7 | 13 | 19 | 25 | |
| Cb | INTRA | | 2 | 8 | 14 | 20 | 26 |
| | INTER | | 3 | 9 | 15 | 21 | 27 |
| Cr | INTRA | | 4 | 10 | 16 | 22 | 28 |
| | INTER | | 5 | 11 | 17 | 23 | 29 |
| CU size: luma max(width, height) | | 64 | 32 | 16 | 8 | 4 | |
| Block size: max(width, height) | | 64 | 32 | 16 | 8 | 4 | 2 |
| Signaled QM coefficients | | | 8 × 8 + DC | | 8 × 8 | 4 × 4 | 2 × 2 |

QM Prediction Process

Instead of transmitting QM coefficients, it is possible to predict the QM either from default values, or from any previously transmitted one. In one embodiment, when the reference QM is the same size, the QM is copied, otherwise it is decimated by the relevant ratio, as illustrated in an example in FIG. 6, wherein a size-4 luma QM is predicted from size-8.

The decimation is described by the following equation:

$$\begin{gathered} \text{ScalingMatrix}[\text{matrixId}][x][y] = \\ \text{refScalingMatrix}[i][j] \text{ with matrixSize} = \\ (\text{matrixId} < 20)?8:(\text{matrixId} < 26)?4:2) \\ x = 0 \ldots \text{matrixSize}-1,\ y = 0 \ldots \text{matrixSize}-1, \\ i = x << (\log2(\text{refMatrixSize}) - \log2(\text{matrixSize})), \text{ and} \\ j = y << (\log2(\text{refMatrixSize}) - \log2(\text{matrixSize})). \end{gathered} \tag{2}$$

where refMatrixSize matches the size of refScalingMatrix (and thus the range of i and j variables).

Figure 6:
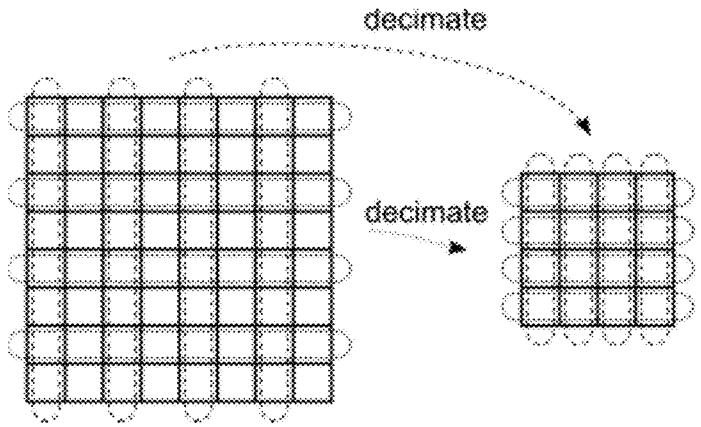
FIG. 6 illustrates prediction from larger size (decimation), according to an embodiment.

In the example shown in FIG. 6, a luma size-4 QM (which is a 4×4 array: matrixSize is 4) is predicted from a luma size-8 QM, which is an 8×8 array (refMatrixSize is 8); one line out of two and one column out of two are dropped to generate the 4×4 array (i.e., element (2x, 2y) in the reference QM is copied to element (x, y) in the current QM).

Equation (3) takes the following form:

$$\begin{gathered} \text{ScalingMatrix}[\text{matrixId}][x][y] = \text{refScalingMatrix}[i][j] \\ x = 0 \ldots 3,\ y = 0 \ldots 3,\ i = x << 1, \text{ and } j = y << 1. \end{gathered} \tag{3}$$

When the reference QM has a DC value, if the current QM needs a DC value, it is copied as DC value; otherwise, it is copied to the top-left QM coefficient.

This QM prediction process is part of the QM decoding process in the preferred embodiment, but could be deferred to the QM derivation process in another embodiment, where the decimation for prediction purpose would be merged with the QM resize sub-process.

QM Derivation Process

The proposed derivation process for quantization matrix first selects the right QM index depending on block parameters as described before (Unified QM index), then unifies the processes of decimation for rectangular blocks, repetition for blocks larger than a size, for example, 8×8, and chroma format adaptation into one single process. The proposed process is based on bit-shifts of x and y output coordinates. To select the right line/column of the selected QM, only left shift followed by right shift of x/y output coordinates are required, as illustrated in equation below.

$$\begin{gathered} m[x][y] = \text{ScalingMatrix}[\text{matrixId}][i][j] \\ \text{with} \\ i = (x << \text{log2MatrixSize}) >> \log2(\text{blkWidth}), \text{ and} \\ j = (y << \text{log2MatrixSize}) >> \log2(\text{blkHeight}). \end{gathered} \tag{4}$$

where log2MatrixSize is the log2 of the size of ScalingMatrix[matrixId] (which is a square 2D array), blk Width and blkHeight are the width and height of the current transform block, respectively, with x ranging from 0 to blkWidth−1 and y ranging from 0 to blkHeight−1.

Figure 7:
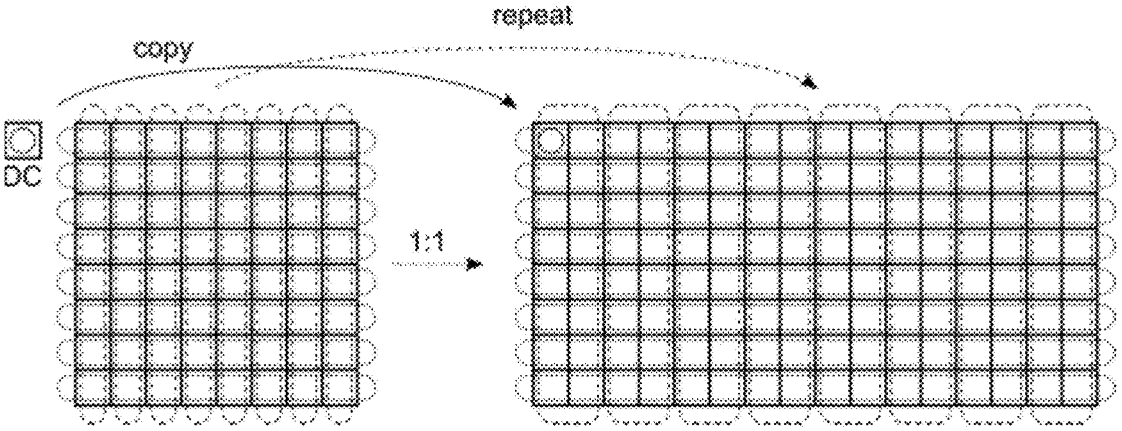
FIG. 7 illustrates combining prediction from larger size and decimation for a rectangular block, according to an embodiment.

In the following, several examples are provided to illustrate the QM derivation process. In the example as illustrated in FIG. 7, the QM for a luma 16×8 block is derived from a luma size-16 QM, which is actually an 8×8 array plus a DC coefficient. For this example, blk Width equals 16, blkHeight equals 8, and log2MatrixSize equals 3, hence equation (5) takes the following form:

$$m[x][y] = \text{ScalingMatrix}[\text{matrixId}][i][j] \tag{5}$$

with $$i = (x << 3) >> 4 =, \text{ and } j = (y << 3) >> 3,$$

$$\text{where } x = 0 \ldots 15 \text{ and } y = 0 \ldots 7.$$

Here, x is right-shifted by 1, and y is unchanged (i.e., column i in the selected QM is copied to columns 2*i and 2*i+1 in the current QM). Additionally, since the selected QM has a DC coefficient, it is copied to m[0][0].

Figure 8:
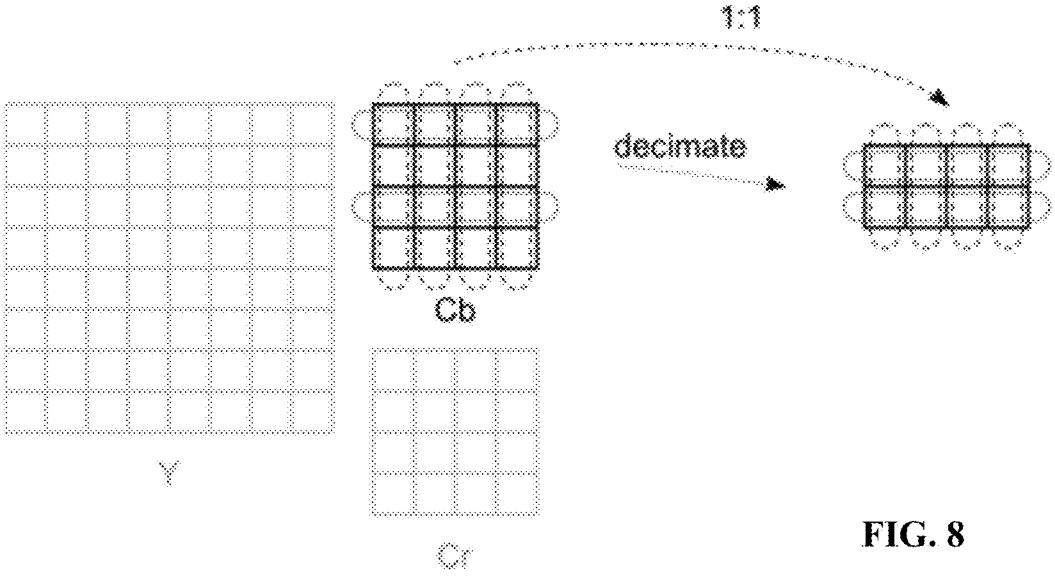
FIG. 8 illustrates a QM derivation process for a rectangular block for chroma, according to an embodiment.

In another example as illustrated in FIG. 8, the QM for a chroma 4×2 block for 8×4 CU (4:2:0 format) is generated. This matches 8×4 CU size, which enclosing square is 8×8. The selected QM is thus the size-8 one, where the chroma QMs are coded as 4×4 arrays. Here, blk Width equals 4, blkHeight equals 2, and log2MatrixSize equals 2, hence equation (6) takes the following form:

$$m[x][y] = \text{ScalingMatrix}[\text{matrixId}][i][j] \tag{6}$$

with $$i = (x << 2) >> 2, \text{ and } j = (y << 2) >> 1 \text{ where } x = 0 \ldots 3 \text{ and } y = 0 \ldots 1.$$

Here, x is unchanged, and y is left-shifted by 1 (i.e., row 2y in the reference QM is copied to row y in the current QM).

In the following examples, the proposed adaptation to 4:2:2 and 4:4:4 formats is different from VVC draft 5. Instead of looking for a QM that matches the chroma block size (except for 64×64 where no chroma matrix exists), the size matching is based on the same (luma) CU size (i.e., the size of the block projected on the luma plane), and coefficients are repeated if needed. This makes the QM design independent from the chroma format.

Figure 9:
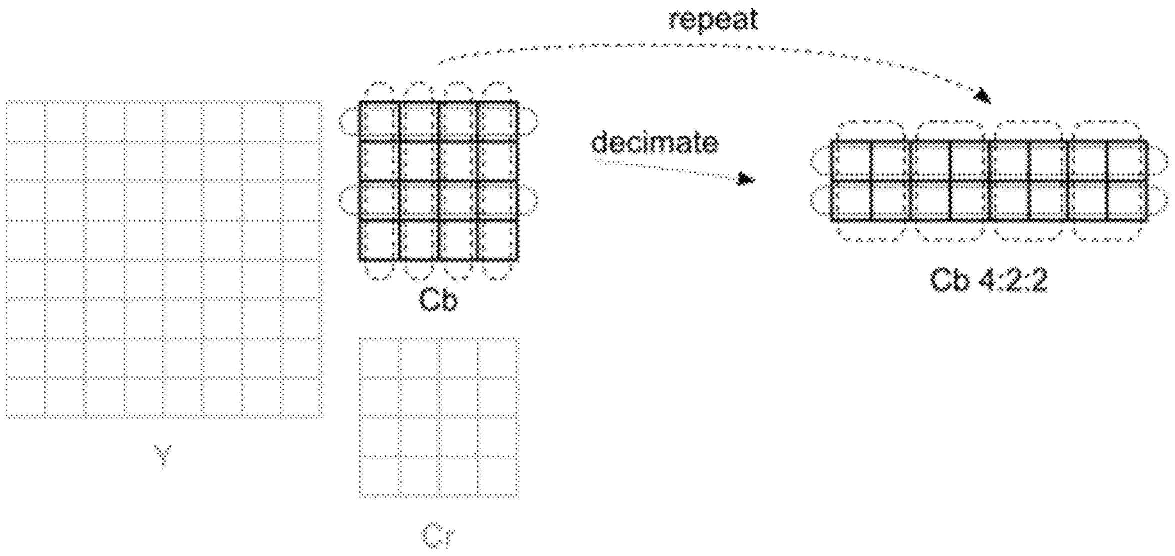
FIG. 9 illustrates a QM derivation process for a rectangular block for chroma (adaptation to 4:2:2 format), according to an embodiment.

In the example shown in FIG. 9, the QM for a chroma 8×2 block for 8×4 CU (4:2:2 format) is generated. The selected QM is the same as the above example as illustrated in FIG. 8, but the 4:2:2 chroma format need twice more columns. Here, columns are repeated, thus x is right-shifted by 1, and y is still left-shifted by 1. In particular, blkWidth equals 8, blkHeight equals 2, and log2MatrixSize equals 2, hence equation (7) takes the following form:

$$m[x][y] = \text{ScalingMatrix}[\text{matrixId}][i][j] \tag{7}$$

with $$i = (x << 2) >> 3, \text{ and } j = (y << 2) >> 1,$$

$$\text{where } x = 0 \ldots 7 \text{ and } y = 0 \ldots 1.$$

Figure 10:
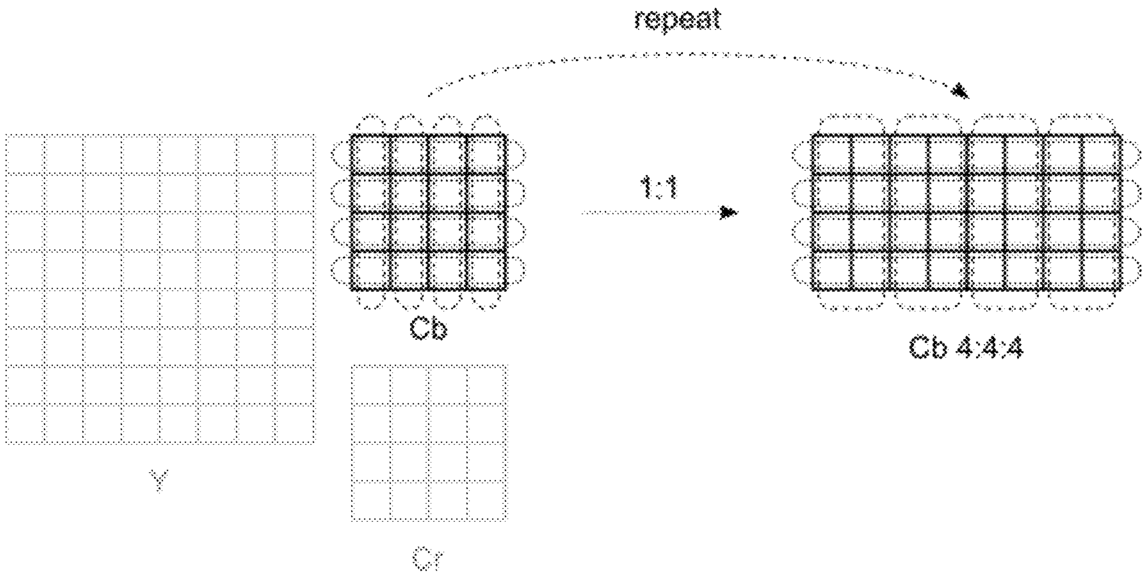
FIG. 10 illustrates a QM derivation process for a rectangular block for chroma (adaptation to 4:4:4 format).

In the example shown in FIG. 10, the QM for a chroma 8×4 block for 8×4 CU (4:4:4 format) is generated. The selected QM is still the same as in the examples shown in FIGS. 8 and 9, but the 4:4:4 chroma format needs twice as many rows and columns as 4:2:0 chroma format. Here, the columns must be repeated, thus x is right-shifted by 1, but the decimation of rows (because of rectangular shape) can be skipped, thus y is not shifted. In particular, blkWidth equals 8, blkHeight equals 4, and log2MatrixSize equals 2, hence equation (8) takes the following form:

$$m[x][y] = \text{ScalingMatrix}[\text{matrixId}][i][j] \tag{8}$$

with $$i = (x << 2) >> 3, \text{ and } j = (y << 2) >> 2, \text{ where } x = 0 \ldots 7 \text{ and } y = 0 \ldots 3.$$

Number of Coefficients Transmitted for Size-64

In one embodiment, to enable prediction of smaller QMs from size-64, all coefficients for size-64 are transmitted in the scaling list syntax, even though the bottom-right quadrant is never used by VVC transformation and quantization process. In general, we may transmit all the coefficients of the largest QM.

However, it is worth noting that the overhead related to this increased number of transmitted coefficients compared to previous work (JVET-N0847) can be limited to 2×16 bits in the worst case, since the syntax element scaling_list_delta_coef can be set to zero for the bottom-right quadrant of a size-64 QM when it is not used as a predictor: for bottom-right quadrant, 4×4=16 delta-coefficients are signaled, each taking 1-bit if forced to zero (coded with exp-Golomb), and there are two size-64 QMs (luma intra/inter).

Tests are described in Table 8, showing that this overhead is marginal compared to the gains brought by prediction improvement.

In another embodiment, coefficients for the bottom-right quadrant of size-64 QMs are not transmitted as part of size-64 QM signaling, but are transmitted as supplemental parameters when a smaller QM is first predicted from a given size-64 QM.

Table 7 provides some comparison of the method described in JVET-N0847 and the proposed one:

TABLE 7

| JVET-N0847 | Proposed |
|---|---|
| Complex rules and dependency between sizeId and matrixId | matrixId alone, single array of ScalingList |
| Single default matrix for intra/inter | Prediction from any previously signaled matrices with decimation |
| Specific text for rectangular block | Separate intra/inter default matrices |
| New Raster2Diag scanning | Unified process upscale/rectangular/4:x:x chroma |
| 5-dimensional ScalingFactor | No new scanning |
| Zero-out process for 64 × 64 | No zero-out process |

In the following, some syntax and semantics according to an embodiment are described.

PPS Syntax and Semantics (Minor Adaptation)

| | Descriptor |
|---|---|
| pic_parameter_set_rbsp( ) { | |
| ... | |
| pps_scaling_list_data_present_flag | u(1) |
| if( pps_scaling_list_data_present_flag ) | |
| scaling_list_data( ) | |
| pps_extension_flag | u(1) |
| ... | |
| } | |

pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0 and pps_scaling_list_data_present_flag is equal to 0, the default scaling matrices are used to derive the array ScalingMatrix as described in the scaling list data semantics as specified in clause 7.4.5.

Please note that this syntax/semantics is an example intended to be close to HEVC standard or VVC draft, and is not limitative. For example, scaling_list_data carriage is not limited to SPS or PPS, and could be transmitted by other means.

Scaling List Data Syntax/Semantics (Simplified)

| | Descriptor |
|---|---|
| scaling_list_data( ) { | |
| for( matrixId = 0; matrixId < 30; matrixId++ ) { | |
| scaling_list_pred_mode_flag[ matrixId ] | u(1) |
| if ( !scaling_list_pred_mode_flag[ matrixId ] ) | |
| scaling_list_pred_matrix_id_delta[ matrixId ] | ue(v) |
| else { | |
| nextCoef = 8 | |
| coefNum = (matrixId < 20) ? 64 : (matrixId < 26) ? 16 : 4 | |
| if ( matrixId < 14 ) { | |
| scaling_list_dc_coef_minus8[ matrixId ] | se(v) |
| nextCoef = scaling_list_dc_coef_minus8[ matrixId ] + 8 | |
| } | |
| for( i = 0; i < coefNum; i++ ) { | |
| scaling_list_delta_coef | se(v) |
| nextCoef = ( nextCoef + scaling_list_delta_coef + 256 ) % 256 | |
| ScalingList[ matrixId ][ i ] = nextCoef | |
| } | |
| } | |
| } | |
| } | |

scaling_list_pred_mode_flag[matrixId] equal to 0 specifies that the scaling matrix is derived from the values of a reference scaling matrix. The reference scaling matrix is specified by scaling_list_pred_matrix_id_delta[matrixId]. scaling_list_pred_mode_flag[matrixId] equal to 1 specifies that the values of the scaling list are explicitly signaled.

scaling_list_pred_matrix_id_delta[matrixId] specifies the reference scaling matrix used to derive the scaling matrix, as follows. The value of scaling_list_pred_matrix_id_delta [matrixId] shall be in the range of 0 to matrixId, inclusive.

When scaling_list_pred_mode_flag[matrixId] is equal to zero:

The variable refMatrixSize and the array refScalingMatrix are first derived as follows:

If scaling_list_pred_matrix_id_delta[matrixId] is equal to zero, the following applies to set default values:

refMatrixSize is set equal to 8, if matrixId is an even number, refScalingMatrix = {{16, 16, 16, 16, 16, 16, 16, 16} // placeholder for *INTRA* default values
{16, 16, 16, 16, 16, 16, 16, 16}
{16, 16, 16, 16, 16, 16, 16, 16}
{16, 16, 16, 16, 16, 16, 16, 16}
{16, 16, 16, 16, 16, 16, 16, 16}
{16, 16, 16, 16, 16, 16, 16, 16}
{16, 16, 16, 16, 16, 16, 16, 16}
{16, 16, 16, 16, 16, 16, 16, 16}}, (9)

otherwise refScalingMatrix = {{16, 16, 16, 16, 16, 16, 16, 16} // placeholder for *INTER* default values
{16, 16, 16, 16, 16, 16, 16, 16}
{16, 16, 16, 16, 16, 16, 16, 16} (10)

-continued

{16, 16, 16, 16, 16, 16, 16, 16}

{16, 16, 16, 16, 16, 16, 16, 16}

{16, 16, 16, 16, 16, 16, 16, 16}

-continued

{16, 16, 16, 16, 16, 16, 16, 16}

{16, 16, 16, 16, 16, 16, 16, 16}}, otherwise (if scaling_list_pred_matrix_id_delta[matrixId] is greater than zero), the following applies:

$$\text{refMatrixId} = \text{matrixId} - \text{scaling\_list\_pred\_matrix\_id\_delta[matrixId]} \quad (11)$$

$$\text{refMatrixSize} = (\text{refMatrixId} < 20)\,?\,8:(\text{refMatrixId} < 26)\,?\,4:2) \quad (12)$$

$$\text{refScalingMatrix} = \text{ScalingMatrix[refMatrixId]} \quad (13)$$

The array ScalingMatrix[matrixId] is then derived as follows:

$$\text{ScalingMatrix[matrixId]}[x][y] = \text{refScalingMatrix}[i][j] \quad (14)$$

$$\text{with matrixSize} = (\text{matrixId} < 20)\,?\,8:(\text{matrixId} < 26)\,?\,4:2)$$

$$x = 0 \ldots \text{matrixSize} - 1,\ y = 0 \ldots \text{matrixSize} - 1,$$

$$i = x \ll (\log 2(\text{refMatrixSize}) - \log 2(\text{matrixSize})), \text{ and}$$

$$j = y \ll (\log 2(\text{refMatrixSize}) - \log 2(\text{matrixSize}))$$

scaling_list_de_coef_minus8[matrixId] plus 8 specifies the first value of the scaling matrix when relevant, as described in clause xxx. The value of scaling_list_de_coef_minus8 [matrixId] shall be in the range of −7 to 247, inclusive.

When scaling_list_pred_mode_flag[matrixId] is equal to zero, scaling_list_pred_matrix_id_delta[matrixId] is greater than zero, and refMatrixId<14, then the following applies:

if matrixId<14, scaling_list_dc_coef_minus8[matrixId] is inferred to be equal to scaling_list_dc_coef_minus8 [refMatrixId], otherwise, ScalingMatrix[matrixId][0][0] is set equal to scaling_list_dc_coef_minus8[refMatrixId]+8

When scaling_list_pred_mode_flag[matrixId] is equal to zero, scaling_list_pred_matrix_id_delta[matrixId] is equal to zero (indicating default values), and matrixId<14, then scaling_list_dc_coef_minus8[matrixId] is inferred to be equal to 8 scaling_list_delta_coef specifies the difference between the current matrix coefficient ScalingList[matrixId][i] and the previous matrix coefficient ScalingList[matrixId][i−1], when scaling_list_pred_mode_flag[matrixId] is equal to 1. The value of scaling_list_delta_coef shall be in the range of −128 to 127, inclusive. The value of ScalingList[matrixId][i] shall be greater than 0.

When present (i.e., scaling_list_pred_mode_flag[matrixId] is equal to 1), the array ScalingMatrix[matrixId] is derived as follows:

$$\text{ScalingMatrix[matrixId]}[i][j] = \text{ScalingList[matrixId]}[k] \quad (15)$$

$$\text{with } k = 0 \ldots \text{coefNum} - 1,$$

$$i = \text{diagScanOrder}[\log 2(\text{coefNum})/2][\log 2(\text{coefNum})/2][k][0], \text{ and}$$

$$j = \text{diagScanOrder}[\log 2(\text{coefNum})/2][\log 2(\text{coefNum})/2][k][1]$$

The main simplifications compared to the JVET-N0847 syntax are the removal of one for( ) loop and indexing simplification from [sizeId][matrixId] to [matrixId].

"Clause xxx" refers to an undetermined section number to be introduced in the VVC specification, that matches the scaling matrix derivation process of this document.

Please note that this syntax/semantics is an example intended to be close to HEVC standard or VVC draft 5, and is not limitative. For example, coefficients range is not restricted to 1 . . . 255, and it could be 1 . . . 127 (7-bit), or −64 . . . 63 for example. Also, it is not limited to 30 QMs organized as 6 types×5 sizes (there could be 8 types, and less or more sizes. See table 5, which can be adapted. Simple adaptations to coefNum and condition for presence of DC coefficient would then be required). The type of QM prediction (here copy only) is not restrictive either. For example, a scaling factor or an offset could be added, and explicit coding could be added on top of prediction as a residual. The same stands for the method used for coefficient transmission (DPCM here), the presence of a DC coefficient, and the number of coefficients being fixed (only a subset could be transmitted).

Regarding default values, it is not limited to two default QMs, associated with MODE_INTRA and MODE_INTER, and filled like here with all-16 values until relevant default values are agreed (one could select the same default QMs as HEVC for example).

Also, the number of coefficients to be signaled coefNum can be expressed xzsxmathematically instead of a sequence of comparisons, with identical result: coefNum=Min(64, 4096>>((matrixId+4)/6)*2), this being closer to HEVC or current VVC draft style, but introducing a division which may not be welcome.

It is noted here that larger matrices are transmitted first, and a single index is used so that the prediction reference (indicated by scaling_list_pred_matrix_id_delta) can be any previously transmitted matrix regardless of the block size or type it was intended for, or default values (e.g., if scaling_list_pred_matrix_id_delta is zero).

Figure 11:
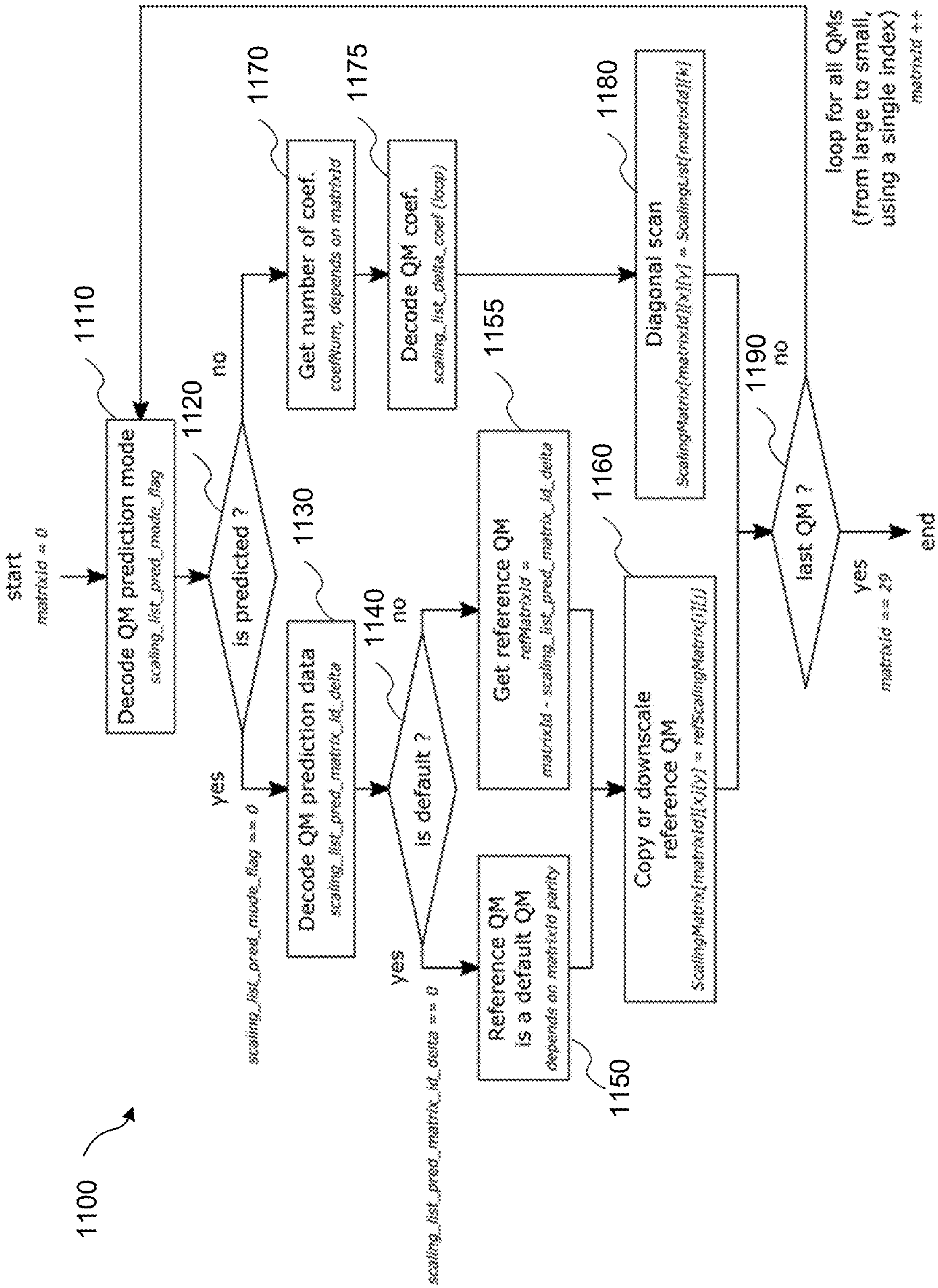
FIG. 11 illustrates a flowchart for parsing the scaling list data syntax structure, according to an embodiment.

FIG. 11 illustrates a process (1100) for parsing the scaling list data syntax structure, according to an embodiment. For this embodiment, input is the coded bitstream, and output is an array of ScalingMatrix. Details about the DC value are omitted for the sake of clarity. In particular, at step 1110, the QM prediction mode is decoded from the bitstream. If the QM is predicted (1120), the decoder further determines if the QM is inferred (predicted) or signaled in the bitstream, depending on the aforementioned flag. At step 1130, the decoder decodes QM prediction data from the bitstream, which is needed to infer the QM when not signaled, e.g., a QM index difference scaling_list_pred_matrix_id_delta. The decoder then determines (1140) whether the QM is predicted from default values (e.g., if scaling_list_pred_matrix_id_delta is zero), or from a previously decoded QM. If the reference QM is a default QM, the decoder selects (1150) a default QM as reference QM. There can be several default QMs to choose from, e.g., depending on the parity of matrixId. Otherwise, the decoder selects (1155) a previously decoded QM as reference QM. The index of the reference QM is derived from matrixId and aforementioned index difference. At step 1160, the decoder predicts the QM from the reference QM. Prediction consists of a simple copy if reference QM is the same size as the current QM, or a decimation if it is larger than expected. Result is stored in ScalingMatrix [matrixId].

If the QM is not predicted (1120), the decoder determines (1170) the number of QM coefficients to be decoded from the bitstream, depending on matrixId. For example: 64 if matrixId is lower than 20, 16 if matrixId is between 20 and 25, 4 otherwise. At step 1175, the decoder decodes the relevant number of QM coefficients from the bitstream. At step 1180, the decoder organizes the decoded QM coefficients in a 2D matrix according to a scanning order, for example, diagonal scan. Result is stored in ScalingMatrix [matrixId]. Using ScalingMatrix[matrixId], the decoder can use the QM derivation process to obtain the quantization matrix m[ ][ ] for de-quantizing a transform block that may be at a non-square shape and/or at a different chroma format.

At step 1190, the decoder checks whether the current QM is the last QM to be parsed. If it is not the last one, the control returns to step 1110; otherwise the QM parsing process stops when all QMs are parsed from the bitstream.

Figure 12:
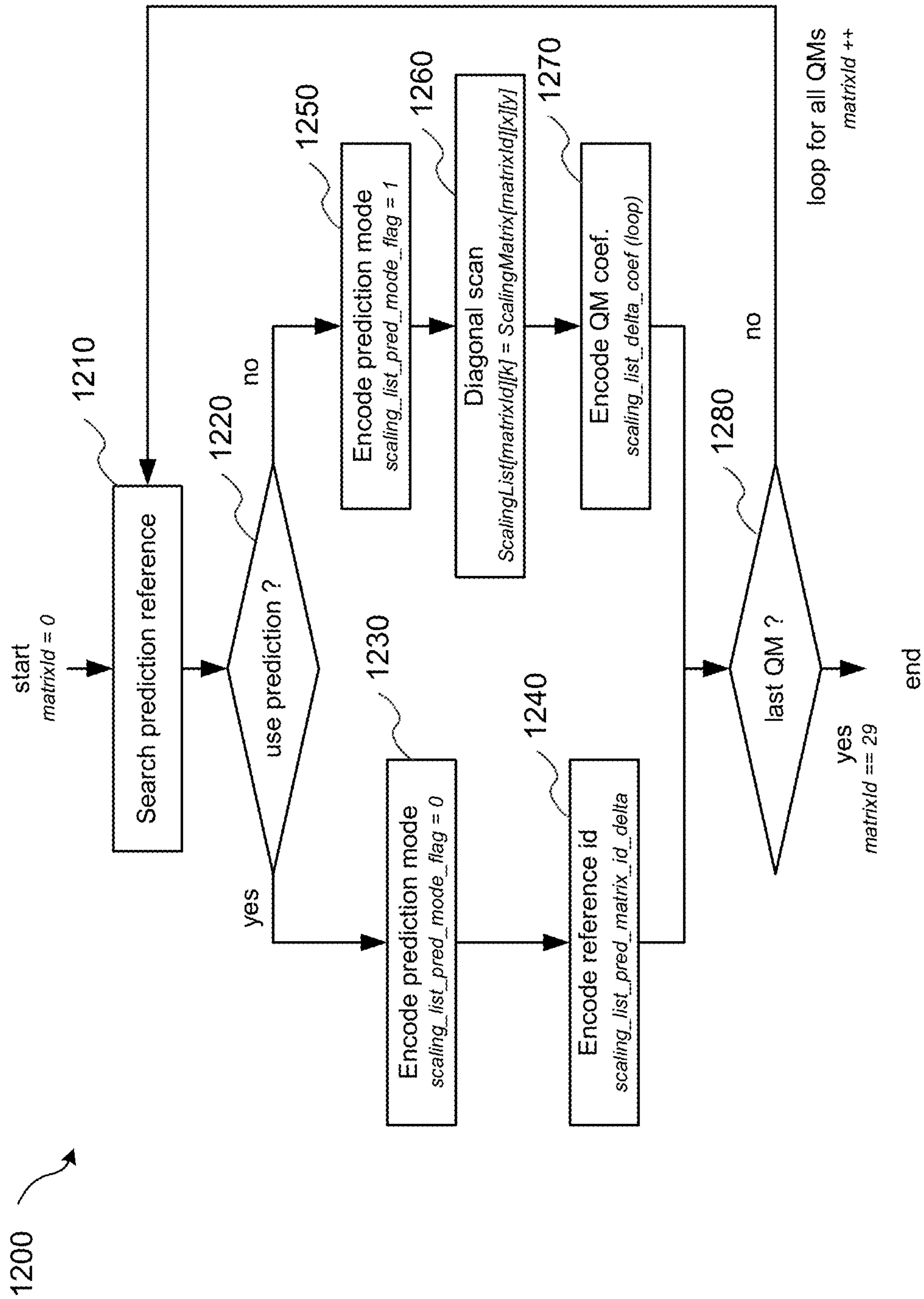
FIG. 12 illustrates a flowchart for encoding the scaling list data syntax structure, according to an embodiment.

FIG. 12 illustrates a process (1200) of encoding the scaling list data syntax structure at the encoder side, according to an embodiment. On the encoder side, QMs are scanned in the described order, from larger to smaller block sizes (e.g., matrixId from 0 to 30). At step 1210, the encoder searches the prediction preference to decide if the current QM is a copy (or decimation) of a previously coded one. QMs can be designed in a way to optimize the efficiency of QM prediction, e.g., if some QMs are initially close enough, or close from default QMs, they can be forced to be equal (or decimated if sizes are different). Moreover, coefficients in the bottom-right quadrant of size-64 QMs can be optimized for better prediction of subsequent QMs, or to reduce QM bit cost if never reused for prediction. Once decided, QM prediction mode is encoded in the bitstream.

In particular, if the encoder decides (1220) to use prediction, at step 1230, the prediction mode is encoded (e.g., scaling_list_pred_mode_flag=0). At step 1240, prediction parameters (e.g., QM index difference scaling_list_pred_matrix_id_delta) are encoded: zero index difference for default QM values, or a relevant index difference if a previous QM was chosen as a prediction reference. On the other hand, if explicit signaling was decided, at step 1250, the prediction mode is encoded (e.g., scaling_list_pred_mode_flag=0). Then diagonal scan (1260) followed by QM coefficient encoding (1270) is performed.

At step 1280, the encoder checks whether the current QM is the last QM to be encoded. If it is not the last one, the control returns to step 1210; otherwise the QM encoding process stops when all QMs are encoded to the bitstream.

Figure 13:
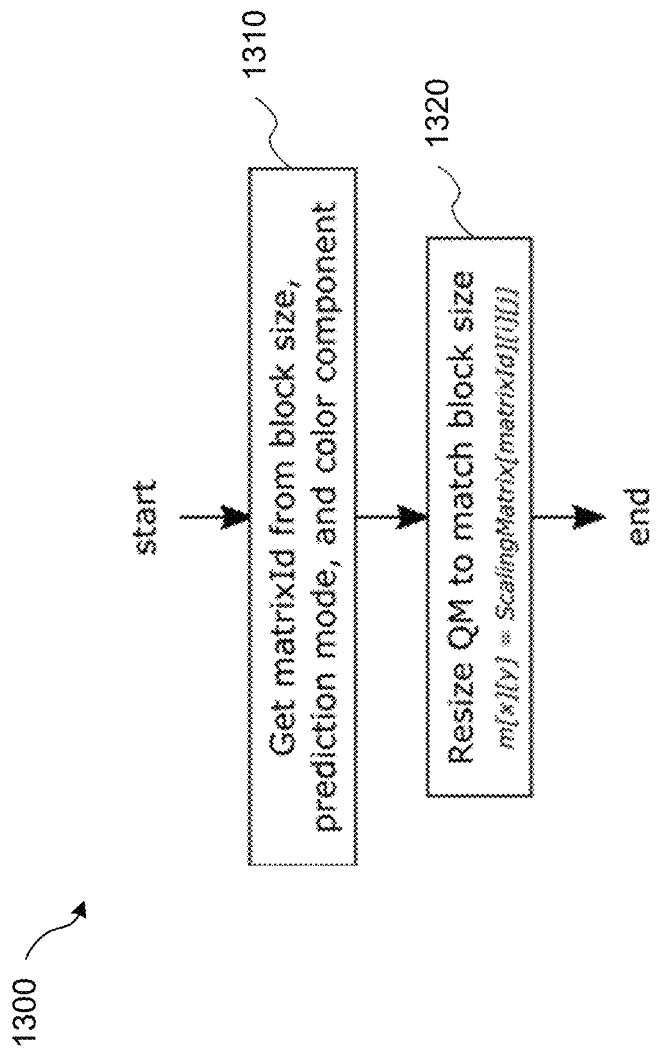
FIG. 13 illustrates a flowchart for a QM derivation process, according to an embodiment.

FIG. 13 illustrates a process 1300 for QM derivation, according to an embodiment. The input can include the ScalingMatrix array, and transform block parameters, such as, size (width/height), prediction mode (intra/inter/IBC, . . . ), and color component (Y/U/V). The output is a QM which has the same size as the transform block. Details about the DC value are omitted for the sake of clarity. In particular, at step 1310, the decoder determines QM index matrixId depending on the current transform block size (width/height), prediction mode (intra/inter/IBC, . . . ), color component (Y/U/V) as described before (Unified QM index). At step 1320, the decoder resizes the selected QM (ScalingMatrix[matrixId]) to match the transform block size, as described before. In a variant, step 1320 can include the decimation needed for prediction.

The QM derivation process is similar at the encoder side. Quantization divides the transform coefficients by QM values, while de-quantization multiplies. But the QM is the same. In particular, the QMs used for reconstruction in the encoder would match the ones signaled in the bitstream.

Conceptually, the transform coefficients d[x][y] can be quantized as the follows, where qStep is the quantization step size and m[ ][ ] is the quantization matrix:

$$\text{TransCoeffLevel}[xTbY][yTbY][c\text{Idx}][x][y]=d[x][y]/q\text{Step}/m[x][y]$$

But for integer computation and to avoid division, it typically looks like:

$$\text{TransCoeffLevel}[xTbY][yTbY][cIdx][x][y] = ((d[x][y]*im[x][y]*i\text{levelScale}[qP\%6] >> (qP/6)) + (1 << (\text{bdShift}-1))) >> \text{bdShift})$$

with e.g. im[x][y]~=65536/m[x][y] and ilevelScale[0 . . . 5]=65536/levelScale[0 . . . 5], and bdShift an appropriate value. Actually, for a software coder im*ilevelScale is typically pre-computed and stored in tables.

In the above, the QM prediction process and QM derivation process are performed separately. In another embodiment, QM prediction can be deferred to the QM derivation process. This embodiment does not change QM signaling syntax. This embodiment, which can be functionally different because of successive resizes, defers the prediction part (get reference QM+copy/downscale), and diagonal scan, to the "QM derivation process" described later.

In one embodiment, the output of the scaling list data parsing process 1100 is then an array of ScalingList( ) instead of ScalingMatrix, along with prediction flags and valid prediction parameters: a ScalingMatrixPredId array always containing the index of a defined ScalingList (either default or signaled). This array is built recursively during QM decoding by interpreting scaling_list_pred_matrix_id_delta, so that the QM derivation process can use this index directly to get actual values to build the QM used to dequantize the current transform block.

In the following, an example is provided to illustrate the scaling list semantics, according to an embodiment.

Scaling Matrix Derivation Process (New: Partly Replaces Description in Scaling List Semantics; This is Section xxx)

Input to this process is a prediction mode predMode, a colour component variable cIdx, a block width blkWidth and a block height blkHeight.

Output of this process is the (blkWidth)×(blkHeight) array m[x][y] (scaling matrix), with x and y the horizontal and vertical coefficient position. Note that SubWidthC and SubHeightC depends on the chroma format and indicates the ratio of the number of samples in the luma component and the chroma component.

The variable matrixId is derived as follows:

```
    matrixId = 6 * sizeId + matrixTypeId                              (xxx-1)
        with sub Width = (cIdx > 0) ? SubWidthC : 1,
          subHeight = (cIdx > 0) ? SubHeightC : 1,
    sizeId = 6 - max( log2( blkWidth * subWidth ), log2( blkHeight * subHeight ) ),
and
    matrixTypeId = ( 2 * cIdx + ( predMode == MODE_INTER ? 1 : 0 ) )
  The variable log2MatrixSize is derived as follows:
    log2MatrixSize = (matrixId < 20) ? 3 : (matrixId < 26) ? 2 : 1    (xxx-2)
  The output array m[ x ][ y ] is derived by applying the following, for x ranging from 0 to
blkWidth − 1 included, and y ranging from 0 to blkHeight − 1 included:
```

-continued

```
    m[ x ][ y ] = ScalingMatrix[ matrixId ][ i ][ j ]                    (xxx-3)
      with i = ( x << log2MatrixSize ) >> log2( blkWidth ), and
      j = ( y << log2MatrixSize ) >> log2( blkHeight )
  If matrixId is lower than 14, m[ 0 ][ 0 ] is further modified as follows:
    m[ 0 ][ 0 ] = scaling_list_dc_coef_minus8[ matrixId ] + 8            (xxx-4)
```

Please note that this is an example, and is not restrictive, as for scaling_list_data syntax and semantics. For example, it is not limited to two default QMs, associated with MODE_INTRA and MODE_INTER, and filled like here with all-16 values until relevant default values are agreed (one could select the same default QMs as HEVC for example). There could be a single default QM, or more than 2. MatrixId computation could be different, e.g., if there is more or less than six types of matrices per block size. What is important is that horizontal and vertical downscale and upscale to adapt to block sizes different from the selected QM is done in a single process, preferably simple (left shift followed by right shift here).

For rectangular blocks, it is not restricted to selecting the QM identifier for current block enclosing square: the derivation of sizeId in equation xxx-1 may follow a different rule.

Also, the selected QM size log2MatrixSize can be expressed mathematically instead of a sequence of comparisons, with identical result: log2MatrixSize=min(3, 6−(matrixId+4)/6), but this introduces a division which may not be welcome.

In the following, an example is provided to describe the semantics for the scaling process, according to an embodiment.

Scaling Process for Transform Coefficients (Adapted)

```
   [...]
   For the derivation of the scaled transform coefficients d[ x ][ y ] with x = 0..nTbW − 1, y
= 0..nTbH − 1, the following applies:
 - The (nTbW)x(nTbH) intermediate scaling factors array m is derived as follows:
   - If one or more of the following conditions are true, m[ x ][ y ] is set equal to 16:
     - scaling_list_enabled_flag is equal to 0.
     - transform_skip_flag[ xTbY ][ yTbY ] is equal to 1.
   - Otherwise, m is the output of the scaling matrix derivation process as specified in
   clause xxx, invoked with the prediction mode CuPredMode[ xTbY ][ yTbY ], the colour
   component variable cIdx, the block width nTbW and the block height nTbH as inputs.
 - The scaling factor ls[ x ][ y ] is derived as follows:
[...]
```

-

The main change compared to VVC draft 5 is the invocation of clause xxx instead of copying part of an array described in scaling_list_data semantics.

Please note as above that this is an example intended to minimize changes to current VVC draft, and is not restrictive. For example, the colour component input for the scaling matrix derivation process could be different from cIdx. Also, QMs are not limited to be used as scaling factors, but could be used as QP-offset, for example.

QM coding performance has been tested, using the same test set as the one used during HEVC standardization, augmented with QM sets derived from recommended or default QMs of common standards (JPEG, MPEG2, AVC, HEVC) and QMs found in a real broadcast. In all of the tests, some QMs are copied from one type to another (e.g., luma to chroma, or intra to inter), and/or one size to another.

The following table reports the number of bits needed to encode scaling_list_data using three different methods: HEVC, JVET-N0847, and proposed. In particular, HEVC uses an HEVC test set (24 QMs per test), and the two other use a derived test set (30 QMs per test, with additional sizes: size-2 for chroma and size-64 for luma; size-2 QMs are down-sampled from size-4, size-64 is copied from size-32, size-32 is copied from size-16, and sizes 16, 8, 4 are kept as is).

TABLE 8

| | HEVC | N0847 | N0847 vs HEVC | Proposed | Proposed vs N0847 | Proposed vs HEVC |
|---|---|---|---|---|---|---|
| JPEG | 3007 | 3729 | +722 (+24%) | 1059 | −2670 (−72%) | −1948 (−65%) |
| MPEG2 | 1067 | 1333 | +266 (+25%) | 489 | −844 (−63%) | −578 (−54%) |
| H264-like | 950 | 1224 | +274 (+29%) | 480 | −744 (−61%) | −470 (−49%) |
| DTT-like | 2264 | 2940 | +676 (+30%) | 1142 | −1798 (−61%) | −1122 (−50%) |

TABLE 8-continued

| | HEVC | N0847 | N0847 vs HEVC | Proposed | Proposed vs N0847 | Proposed vs HEVC |
|---|---|---|---|---|---|---|
| HEVC | 1281 | 1554 | +273 (+21%) | 535 | −1019 (−66%) | −746 (−58%) |
| symmetry1 | 2090 | 2658 | +568 (+27%) | 892 | −1766 (−66%) | −1198 (−57%) |
| symmetry2 | 1272 | 1620 | +348 (+27%) | 997 | −623 (−38%) | −275 (−22%) |
| symmetry3 | 2660 | 3220 | +560 (+21%) | 2094 | −1126 (−35%) | −566 (−21%) |
| symmetry4 | 2542 | 3146 | +604 (+24%) | 2064 | −1082 (−34%) | −478 (−19%) |
| symmetry7 | 3366 | 4264 | +898 (+27%) | 2675 | −1589 (−37%) | −691 (−21%) |
| asymmetry1 | 2414 | 3078 | +664 (+28%) | 1004 | −2074 (−67%) | −1410 (−58%) |
| asymmetry2 | 1394 | 1778 | +384 (+28%) | 1057 | −721 (−41%) | −337 (−24%) |
| asymmetry3 | 2962 | 3628 | +662 (+22%) | 2272 | −1352 (−37%) | −690 (−23%) |
| asymmetry4 | 3560 | 4344 | +784 (+22%) | 2828 | −1516 (−35%) | −732 (−21%) |
| asymmetry7 | 3946 | 5406 | +1460 (+37%) | 3268 | −2138 (−40%) | −678 (−14%) |
| Average | 2318 | 2928 | +610 (+26%) | 1524 | −1404 (−48%) | −795 (−34%) |

For this test, it can be seen that the proposed technique saves a significant amount of bits, even compared to HEVC whereas the proposed method encodes more QMs.

Referring back to the approach in JCTVC-E073, reference indexing (triplet: QMPS, size, type) in JCTVC-E073 is more complex than what is proposed here since previous QMPS indexing requires storage of previous QMPS. Linear interpolation introduces complexity. Down-sampling is similar to what is proposed here.

Referring back to the approach in JCTVC-H0314, transmission in larger to smaller is close to what is proposed here, however, fixed prediction tree in JCTVC-H0314 is less flexible than the unified indexing and explicit reference proposed here.

QM for Intra Block Copy Mode

In the above, different QMs are specified for two block prediction modes, namely INTRA and INTER. However, there is a new prediction mode in VVC in addition to INTRA and INTER: IBC (Intra Block Copy), where a block can be predicted from reconstructed samples of the same picture, with an appropriate displacement vector. For QM selection in IBC prediction mode, both JVET-N0847 and the above embodiments use the same QMs as INTRA mode.

Since IBC mode is closer to INTER than INTRA, in one embodiment, it is proposed to reuse QMs signaled for INTER mode (instead of INTRA). However, IBC, whereas close to INTER prediction, is different: the displacement vector does not match object or camera motion, but is used for texture copy. This may lead to specific artefacts, where specific QMs may help to optimize coding of IBC blocks in a different embodiment. In the following, we propose to change the QM selection for IBC prediction mode:

- The preferred embodiment is to select the same QMs as INTER mode (instead of INTRA), because IBC is closer to INTER prediction than INTRA prediction.
- Another option is to have specific QMs for IBC mode.
  - These could be explicitly signaled in the syntax, or inferred (e.g., average of INTRA and INTER QMs).

In the preferred embodiment, the QM selection or derivation process for a specific transform block selects INTER QMs if the block has IBC prediction mode. Referring back to FIG. 12, step 1210 of the QM derivation process needs to be adjusted as described below.

In draft text proposed above, QM selection is described in equation (xxx-1), which can be changed as follows

```
matrixId = 6 * sizeId + matrixTypeId                                    (xxx-1)
  with subWidth = (cIdx > 0) ? SubWidthC : 1,
  subHeight = (cIdx > 0) ? SubHeightC : 1,
  sizeId = 6 − max( log2( blkWidth * subWidth ), log2( blkHeight * subHeight ) ), and
  matrixTypeId = ( 2 * cIdx + ( predMode = = MODE_INTRA ? 0 : 1 ) )
```

Note that a block may be encoded in the intra mode (MODE_INTRA), inter mode (MODE_inter) or intra block copy mode (MODE_IBC). When matrixTypeId is set as in Table 6 or (matrixTypeId=(2*cIdx+(predMode==MODE_INTER?1:0))), a MODE_IBC block selects matrixTypeId as if it is a MODE_INTRA block. With the change in (xxx-1): matrix TypeId=(2*cIdx+(predMode==MODE_INTRA?0:1)), a MODE_IBC block selects matrixTypeId as if it is a MODE_INTER block.

In draft text proposed by JVET-N0847, QM selection is described in table 7-14, which can be changed as follows. In particular, matrixId for MODE_IBC is assigned in the same manner as MODE_INTER, rather than the same as MODE_INTRA as in JVET-N0847.

TABLE 9

Changes to JVET-N0847 specification of matrixId according to sizeId, prediction mode and colour component

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |
| 2, 3, 4, 5, 6 | MODE_INTER | 0 (Y) | 3 |
| 1, 2, 3, 4, 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 3 |
| 1, 2, 3, 4, 5 | MODE_IBC | 1 (Cb) | 4 |
| 1, 2, 3, 4, 5 | MODE_IBC | 2 (Cr) | 5 |

Variant 1: Explicit Signaling of QMs for IBC

In this variant, specific QMs are used for IBC blocks (different from INTRA and INTER QMs), and these QMs are explicitly signaled in the bitstream. This makes more QMs, which requires adaptation of scaling_list_data syntax and matrixId mapping, and has a bit cost impact. According to this variant, QM selection described in equation (xxx-1) can be changed as follows

```
matrixId = 6 * sizeId + matrixTypeId                                          (xxx-1)
   with subWidth = (cIdx > 0) ? SubWidthC : 1,
   subHeight = (cIdx > 0) ? SubHeightC : 1,
   sizeId = 6 − max( log2( blkWidth * subWidth ), log2( blkHeight * subHeight ) ), and
   matrixTypeId = ( 3 * cIdx + ( predMode = = MODE_INTRA ? 0 : ( predMode ==
MODE_INTER ? 1 : 2 ) ) )
```

In JVET-N0847, QM selection table can be changed as follows:

TABLE 10

Changes to JVET-N0847 to add more QMs for IBC

| sizeId | CuPredMode | cIdx (Colour component) | matrixId |
|---|---|---|---|
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |
| 2, 3, 4, 5, 6 | MODE_INTER | 0 (Y) | 3 |
| 1, 2, 3, 4, 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 6 |
| 1, 2, 3, 4, 5 | MODE_IBC | 1 (Cb) | 7 |
| 1, 2, 3, 4, 5 | MODE_IBC | 2 (Cr) | 8 |

Variant 2: Inferred QMs for IBC Mode

In this variant, specific QMs are used for IBC blocks (different from INTRA and INTER QMs). However, these QMs are not signaled in the bitstream, but inferred: e.g., as an average of INTRA and INTER QMs, or specific default values, or a specific change to INTER QM, like scaling and offset.

Variant 3: Explicit IBC QMs for Luma Only

In this variant, additional QMs for IBC are limited to luma only; chroma QMs for IBC can either reuse INTER QMs as in variant 1 or infer new ones as in variant 2.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the quantization and inverse quantization modules (230, 240, 340), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein are descriptive terms. As such, they do not preclude the use of other syntax element names. In the above, the syntax elements for PPS and scaling list are mainly used to illustrate various embodiments. It should be noted that these syntax elements can be placed in other syntax structures.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:

obtaining a single identifier for a quantization matrix, based on a block size identifier, a color component type, and a prediction mode of a block to be decoded in a picture, wherein an Intra Block Copy prediction mode is considered as an Inter prediction mode when obtaining said single identifier, and wherein said single identifier is obtained based on N*sizeId+matrixTypeId, where matrixTypeId indicates said color component type and said prediction mode of said block, N is a number of possible type identifiers indicated by matrixTypeId, and sizeId indicates said block size identifier;

decoding a syntax element indicating a reference quantization matrix, wherein said syntax element specifies a difference between an identifier of said reference quantization matrix and said single identifier for said quantization matrix;

obtaining said quantization matrix based on said reference quantization matrix;

de-quantizing transform coefficients for said block based on said quantization matrix; and decoding said block based on said de-quantized transform coefficients.

2. The method of claim 1, wherein said single identifier is obtained based on whether said prediction mode of said block is an Intra prediction mode or an Inter prediction mode.

3. The method of claim 1, wherein a quantization matrix is signaled for luma component of said block, and a quantization matrix is derived for chroma component by considering said prediction mode as an Inter prediction mode.

4. The method of claim 1, wherein another reference quantization matrix is obtained by considering said Intra Block Copy prediction mode as an Intra mode, and wherein said quantization matrix is obtained as an average of said reference quantization matrix and said another reference quantization matrix.

5. An apparatus, comprising:

one or more processors, wherein said one or more processors are configured to:

obtain a single identifier for a quantization matrix, based on a block size identifier, a color component type, and a prediction mode of a block to be decoded in a picture, wherein an Intra Block Copy prediction mode is considered as an Inter prediction mode when obtaining said single identifier, and wherein said single identifier is obtained based on N*sizeId+matrixTypeId, where matrixTypeId indicates said color component type and said prediction mode of said block, N is a number of possible type identifiers indicated by matrixTypeId, and sizeId indicates said block size identifier;

decode a syntax element indicating a reference quantization matrix, wherein said syntax element specifies a difference between an identifier of said reference quantization matrix and said single identifier for said quantization matrix;

obtain said quantization matrix based on said reference quantization matrix;

de-quantize transform coefficients for said block based onto said quantization matrix; and decode said block based on said de-quantized transform coefficients.

6. The apparatus of claim 5, wherein said single identifier is obtained based on whether said prediction mode of said block is an Intra prediction mode or an Inter prediction mode.

7. The apparatus of claim 5, wherein a quantization matrix is signaled for luma component of said block, and a quantization matrix is derived for chroma component by considering said prediction mode as an Inter prediction mode.

8. The apparatus of claim 5, wherein another reference quantization matrix is obtained by considering said Intra Block Copy prediction mode as an Intra mode, and wherein said quantization matrix is obtained as an average of said reference quantization matrix and said another reference quantization matrix.

9. A method, comprising:

accessing a quantization matrix for a block to be encoded in a picture;

obtaining a single identifier for said quantization matrix, based on a block size identifier, a color component type, and a prediction mode of said block, wherein an Intra Block Copy prediction mode is considered as an Inter prediction mode when obtaining said single identifier, and wherein said single identifier is obtained based on N*sizeId+matrixTypeId, where matrixTypeId indicates said color component type and said prediction mode of said block, N is a number of possible type identifiers indicated by matrixTypeId, and sizeId indicates said block size identifier;

encoding a syntax element indicating a reference quantization matrix, wherein said syntax element specifies a difference between an identifier of said reference quantization matrix and said single identifier for said quantization matrix;

quantizing transform coefficients for said block based on said quantization matrix; and entropy encoding said quantized transform coefficients.

10. The method of claim 9, wherein said single identifier is obtained based on whether said prediction mode of said block is an Intra prediction mode or an Inter prediction mode.

11. The method of claim 9, wherein a quantization matrix is signaled for luma component of said block, and a quantization matrix is derived for chroma component by considering said prediction mode as an Inter prediction mode.

12. The method of claim 9, wherein another reference quantization matrix is obtained by considering said Intra Block Copy prediction mode as an Intra mode, and wherein said quantization matrix is obtained as an average of said reference quantization matrix and said another reference quantization matrix.

13. An apparatus, comprising:

one or more processors, wherein said one or more processors are configured to:

access a quantization matrix for a block to be encoded in a picture;

obtain a single identifier for said quantization matrix, based on a block size identifier, a color component type, and a prediction mode of said block, wherein an Intra Block Copy prediction mode is considered as an Inter prediction mode when obtaining said single identifier, and wherein said single identifier is obtained based on N*sizeId+matrixTypeId, where matrixTypeId indicates said color component type and said prediction mode of said block, N is a number of possible type identifiers indicated by matrixTypeId, and sizeId indicates said block size identifier;

encode a syntax element indicating a reference quantization matrix, wherein said syntax element specifies a difference between an identifier of said reference quantization matrix and said single identifier for said quantization matrix;

quantize transform coefficients for said block based on said quantization matrix; and entropy encode said quantized transform coefficients.

14. The apparatus of claim 13, wherein said single identifier is obtained based on whether said prediction mode of said block is an Intra prediction mode or an Inter prediction mode.

15. The apparatus of claim 13, wherein a quantization matrix is signaled for luma component of said block, and a quantization matrix is derived for chroma component by considering said prediction mode as an Inter prediction mode.

16. The apparatus of claim 13, wherein another reference quantization matrix is obtained by considering said Intra Block Copy prediction mode as an Intra mode, and wherein said quantization matrix is obtained as an average of said reference quantization matrix and said another reference quantization matrix.

* * * * *